US012012794B2

(12) United States Patent
Dreyer

(10) Patent No.: US 12,012,794 B2
(45) Date of Patent: Jun. 18, 2024

(54) SWING DOOR OPERATOR SYSTEM AND A METHOD OF REGULATING A SWING DOOR OPERATOR

(71) Applicant: Assa Abloy Entrance Systems AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 217 days.

(21) Appl. No.: 17/604,839

(22) PCT Filed: Apr. 29, 2020

(86) PCT No.: PCT/EP2020/061855
§ 371 (c)(1),
(2) Date: Oct. 19, 2021

(87) PCT Pub. No.: WO2020/229174
PCT Pub. Date: Nov. 19, 2020

(65) Prior Publication Data

US 2022/0178188 A1 Jun. 9, 2022

(30) Foreign Application Priority Data

May 10, 2019 (SE) .................................... 1930151-4

(51) Int. Cl.
*E05F 1/00* (2006.01)
*E05F 1/10* (2006.01)
(Continued)

(52) U.S. Cl.
CPC ............ *E05F 1/1041* (2013.01); *E05F 15/43* (2015.01); *E05F 15/73* (2015.01); *E05Y 2400/53* (2013.01);
(Continued)

(58) Field of Classification Search
CPC ......... E05F 2015/483; E05F 5/06; E05F 5/00; E05F 15/43; E05F 15/40; E05F 15/60;
(Continued)

(56) References Cited

U.S. PATENT DOCUMENTS 4,577,437 A 3/1986 Gionet et al.
8,225,458 B1 * 7/2012 Hoffberg ................ E05F 15/73 16/84
(Continued)

FOREIGN PATENT DOCUMENTS

CN 105679311 6/2016
CN 109312594 2/2019
(Continued)

OTHER PUBLICATIONS

International Search Report in PCT/EP2020/061855 dated Aug. 7, 2020.
(Continued)

*Primary Examiner* — Chi Q Nguyen
(74) *Attorney, Agent, or Firm* — Wissing Miller LLP

(57) ABSTRACT

The present invention relates to a method, a swing door system and a swing door operator (10) for moving a swing door leaf (20) between a closed and an open position (C,O). The swing door operator (10) includes at least one drive unit (100), a control unit (200) and a sensor (300). The control unit (200) is operatively connected to the drive unit and to the sensor (300) and is configured to regulate the drive unit to move the swing door leaf (20) between the closed and open position (C, O). The sensor (300) is configured to identify an object (30) in a safety volume (400) in front of a first side (21) of the swing door leaf (20), where the safety volume (400) comprises a first volume (401) and a second volume (402).

19 Claims, 4 Drawing Sheets

(51) Int. Cl.
*E05F 15/43* (2015.01)
*E05F 15/73* (2015.01)

(52) U.S. Cl.
CPC ..... *E05Y 2400/852* (2013.01); *E05Y 2800/11* (2013.01); *E05Y 2800/236* (2013.01); *E05Y 2900/132* (2013.01)

(58) Field of Classification Search
CPC ......... E05F 15/70; E05F 15/73; E05F 15/632; E05F 2017/005; E05Y 2400/504; E05Y 2400/458; E05Y 2400/502; E05Y 2800/404; E05Y 2400/852; E05Y 2400/508; E05Y 2900/132; E05Y 2400/50; E05Y 2201/254; E05Y 2400/21; E05Y 2201/25; E05Y 2201/256; E05Y 2201/21; E05Y 2400/532; E05Y 2900/531
USPC ............. 49/31, 26, 28, 36; 250/221; 701/49, 701/301, 45, 36, 26; 340/901, 540; 318/480, 445
See application file for complete search history.

(56) References Cited

U.S. PATENT DOCUMENTS 11,098,519 B2 * 8/2021 Dreyer .................... E05F 15/73
11,168,508 B2 * 11/2021 Dreyer .................... E05F 15/40
11,199,038 B2 * 12/2021 Dreyer .................... E05F 15/70
11,339,604 B2 * 5/2022 Dreyer .................... E05F 15/43
11,536,078 B2 * 12/2022 Dreyer .................... E05F 15/73
2002/0036476 A1 * 3/2002 Zengguang ............. G01S 17/04 340/556
2010/0253516 A1 * 10/2010 Lemerand ............... E05F 15/73 340/545.1
2011/0276234 A1 * 11/2011 Van Gastel ............. E05F 15/73 701/49
2013/0127590 A1 * 5/2013 Braverman ............. E05F 15/79 340/5.7
2013/0145692 A1 * 6/2013 Laird ...................... E05F 15/73 49/31
2015/0059248 A1 3/2015 Iwata et al.
2018/0238672 A1 * 8/2018 Miyagi .................. G01V 3/088
2020/0208459 A1 * 7/2020 Trobro .................. E05F 15/603

FOREIGN PATENT DOCUMENTS

DE 19653026 6/1997
EP 2843173 3/2015
JP 2015064343 4/2015
WO 2017207729 12/2017
WO 2018178054 10/2018
WO 2018197367 11/2018

OTHER PUBLICATIONS

Swedish Search Report in 1930151-4 dated Nov. 11, 2019.
Chinese Office Action in 2020800355498, dated Jan. 19, 2023.

* cited by examiner

SWING DOOR OPERATOR SYSTEM AND A METHOD OF REGULATING A SWING DOOR OPERATOR

This application is a 371 of PCT/EP2020/061855, filed on Apr. 29, 2020, published on Nov. 19, 2020 under publication number WO 2020/229174, which claims priority benefits from Swedish Patent Application No. 1930151-4, filed on May 10, 2019, the disclosure of which is incorporated herein by reference.

FIELD OF THE INVENTION

The present invention relates to a swing door operator for moving a swing door leaf between a closed and an open position, a swing door system and a method of regulating a swing door operator for moving a swing door leaf between a closed and an open position. More specifically, the disclosure relates to a swing door operator for moving a swing door leaf between a closed and an open position, a swing door system and a method of regulating a swing door operator for moving a swing door leaf between a closed and an open position.

BACKGROUND ART

Doors that open automatically are widely used throughout the modern society, especially in public buildings and offices. When automated doors are used the automated door is often equipped with a sensor for identifying persons and objects for preventing the door from hitting a person standing in the way of the moving door leaf. Such a solution may, however, lead to that the sensor detects a person in the path of a swing door leaf when the person is reaching for a door handle to open the swing door and the swing door operator will not assist the person trying to opening the door. The problem has typically been solved by having a button or switch at a distance from the way of the moving door leaf and that should be pressed to automatically open or assisting to open the swing door by the door operator.

There is thus a problem in the industry when it comes to safety during the opening cycle of automatic swing doors.

SUMMARY

It is an object to mitigate, alleviate or eliminate one or more of the above-identified deficiencies in the art and disadvantages singly or in any combination and solve at least the above mentioned problem.

Any or all of the above objects are achieved by means of a swing door operator for moving a door leaf between an open and closed position, as claimed in the associated independent claim, preferred variants thereof being defined in the associated dependent claims.

According to a first aspect there is provided a swing door operator for moving a swing door leaf between a closed and an open position. The swing door operator comprising at least one drive unit, a control unit and a sensor. The control unit is operatively connected to the drive unit and to the sensor and configured to regulate the drive unit to move the swing door leaf between the closed and open position. The sensor is configured to identify an object in a safety volume in front of a first side of the swing door leaf, the safety volume comprising a first volume and a second volume, the second volume extending from at least an outer surface of the safety volume towards the swing door leaf. The control unit is configured, based on input from the sensor, to determine if an object is positioned in the first or the second volume of the safety volume, the control unit is configured to regulate the drive unit to move the swing door leaf according to a safety action if an object is determined to be positioned in the first volume of the safety volume, and the control unit is configured to regulate the drive unit to move the swing door leaf according to a second action if an object is determined to be positioned in the second volume of the safety volume.

By having a swing door operator according to the above an opening action of the swing door leaf could be done even if an object is identified in parts of the safety volume of the swing door leaf.

According to some embodiments, the safety action of the control unit comprises to stop the drive unit from moving the swing door leaf and/or to reverse the drive unit to move the swing door leaf in an opposite direction.

According to some embodiments, the second action of the control unit comprises to continue to move the swing door leaf by the drive unit between the closed and open position as if the object has not been identified.

By having a swing door operator according to the above an opening action of the swing door leaf could be done even if an object is identified in parts of the safety volume of the swing door leaf.

According to some embodiments, the second action of the control unit comprises to initiate an opening of the swing door leaf by the drive unit to move the swing door leaf between the closed and open position.

By having a swing door operator according to the above an opening action of the swing door leaf could be initiated by the hand of a person reaching for a door handle of the door leaf and there will be no need for a separate button for initiating the opening.

According to some embodiments, the second volume extends from the at least one outer surface of the safety volume to the swing door leaf.

By an outer surface is meant the boarders of the safety volume that is facing away from the swing door leaf.

According to some embodiments, the second volume has a shape corresponding to a through going hole in the safety volume.

According to some embodiments, the second volume has one or more of a cubical, pyramid, cone, and cylindrical shape.

According to some embodiments, the second volume extends from at least one or more further outer surfaces of the safety volume towards the swing door leaf.

According to some embodiments, the control unit is configured to regulate the drive unit to move the swing door leaf according to the safety action or the second action if a first object is determined to be positioned in the first volume and in the second volume of the safety volume.

According to some embodiments, the control unit is configured to regulate the drive unit to move the swing door leaf according to the safety action if the first object is determined to be positioned in the first volume and a second object is determined to be positioned in the second volume of the safety volume.

According to some embodiments, the safety volume has a cubical or wedge shape.

According to some embodiments, the safety volume at least comprises a volume above a safety zone at which the swing door leaf moves when it is moved between the closed to the open position.

According to some embodiments, the first side of the swing door leaf is directed towards the direction that the swing door leaf moves when it is moved from the closed position towards the open position.

According to some embodiments, the first side of the swing door leaf is directed away from the direction that the swing door leaf moves when it is moved from the closed position towards the open position.

According to a second aspect there is provided a swing door system comprising a swing door leaf and a swing door operator according to any of the first aspect.

According to a third aspect there is provided a method of regulating a swing door operator for moving a swing door leaf between a closed and an open position, the swing door operator comprising at least one drive unit, a control unit and a sensor, the control unit is operatively connected to the drive unit and to the sensor and configured to regulate the drive unit to move the swing door leaf between the closed and open position, the method comprising identifying, by the sensor, an object in a safety volume in front of a first side of the swing door leaf, the safety volume comprising a first volume and a second volume, the second volume extending from at least an outer surface of the safety volume towards the swing door leaf, determining, based on input from the sensor, if the object is positioned in the first or the second volume of the safety volume, regulating the drive unit to move the swing door leaf according to a safety action, if an object is determined to be positioned in the first volume of the safety volume, and regulating the drive unit to move the swing door leaf according to a second action if an object is determined to be positioned in the second volume of the safety volume.

By having a swing door operator according to the above an opening action of the swing door leaf could be done even if an object is identified in parts of the safety volume of the swing door leaf.

According to some embodiments, the second action of the step of regulating comprises to continue to move the swing door leaf by the drive unit between the closed and open position as if the object has not been identified.

According to some embodiments, the second action of the step of regulating comprises to initiate an opening of the swing door leaf.

Effects and features of the second and third aspects are to a large extent analogous to those described above in connection with the first aspect. Embodiments mentioned in relation to the first aspect are largely compatible with the second and third aspects.

A further scope of applicability of the present invention will become apparent from the detailed description given below. However, it should be understood that the detailed description and specific examples, while indicating preferred embodiments of the invention, are given by way of illustration only. Various changes and modifications within the scope of the invention will become apparent to those skilled in the art from the detailed description.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present invention will be more fully appreciated by reference to the following illustrative and non-limiting detailed description of example embodiments of the present invention, when taken in conjunction with the accompanying drawings.

Figure shows a top view of a swing door system having a swing door operator in an open position.

Figure 4:
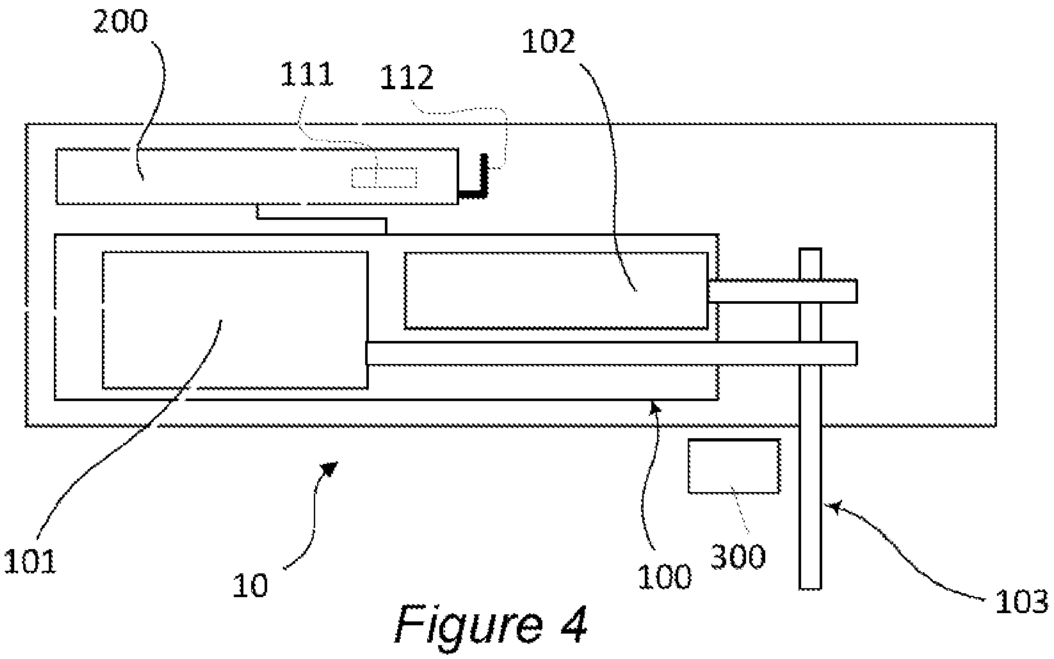

FIG. 4 shows detailed schematic view of a swing door operator according one embodiment of the invention.

Figure 5:
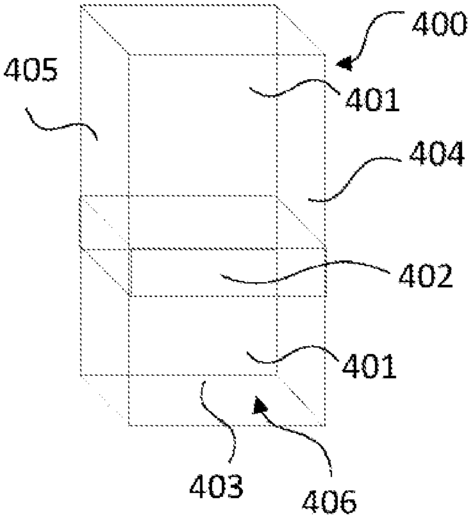

FIG. 5 shows a schematic view of a safety volume.

Figure 6:
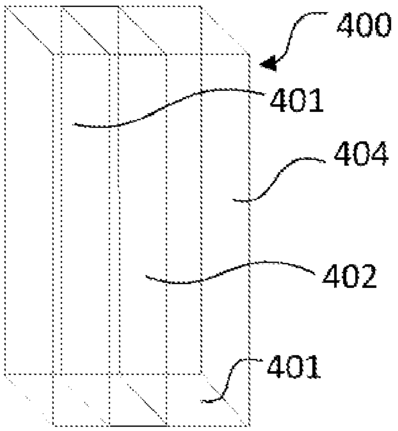

FIG. 6 shows a schematic view of a safety volume.

Figure 7:
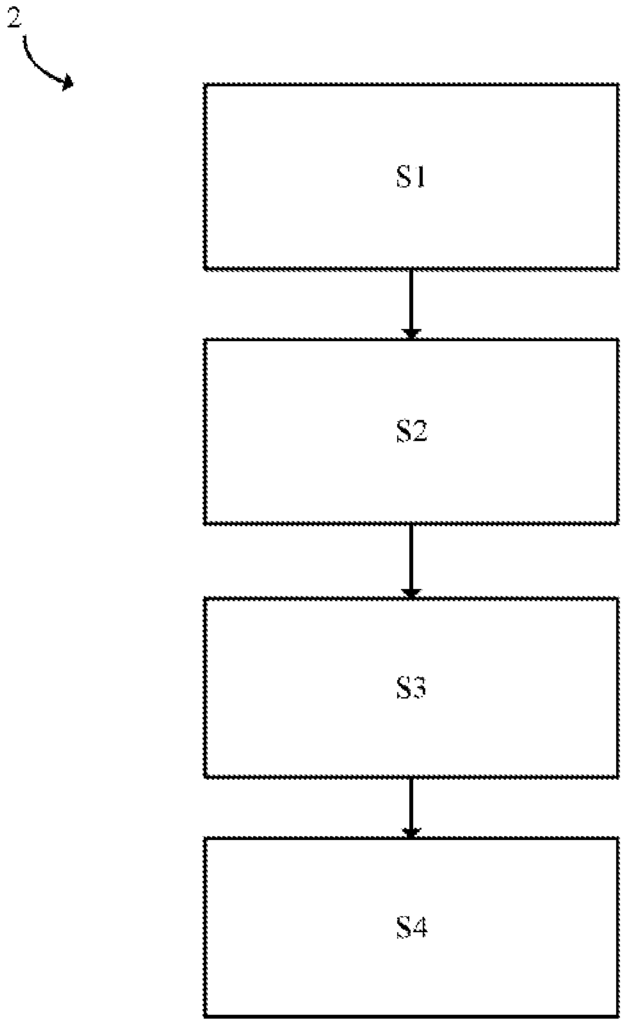

FIG. 7 shows a flow chart of a method.

DETAILED DESCRIPTION

The present invention will now be described with reference to the accompanying drawings, in which currently preferred example embodiments of the invention are shown. This invention may, however, be embodied in many different forms and should not be construed as limited to the herein disclosed embodiments. The disclosed embodiments are provided to fully convey the scope of the invention to the skilled person.

Aspects of the present disclosure will be described more fully hereinafter with reference to the accompanying FIGS. 1 to 7. The assembly and method disclosed herein can, however, be realized in many different forms and should not be construed as being limited to the aspects set forth herein.

The terminology used herein has the purpose of describing particular aspects of the disclosure only, and is not intended to limit the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present invention relates to door operators for different types of door sets and door leafs. More specifically, the invention relates to swing door operators for one or more swing door sets and the functionality of each swing door operator for operating the swing door operator and/or using it. Furthermore, the present invention relates to a swing door operator system that comprises one or more such swing door operators connected to one or more swing door leafs, and such a system for any type of swing door leaves, e.g. made up of one or more sections or halves being swingable about a separate or common axis.

Figure 1:
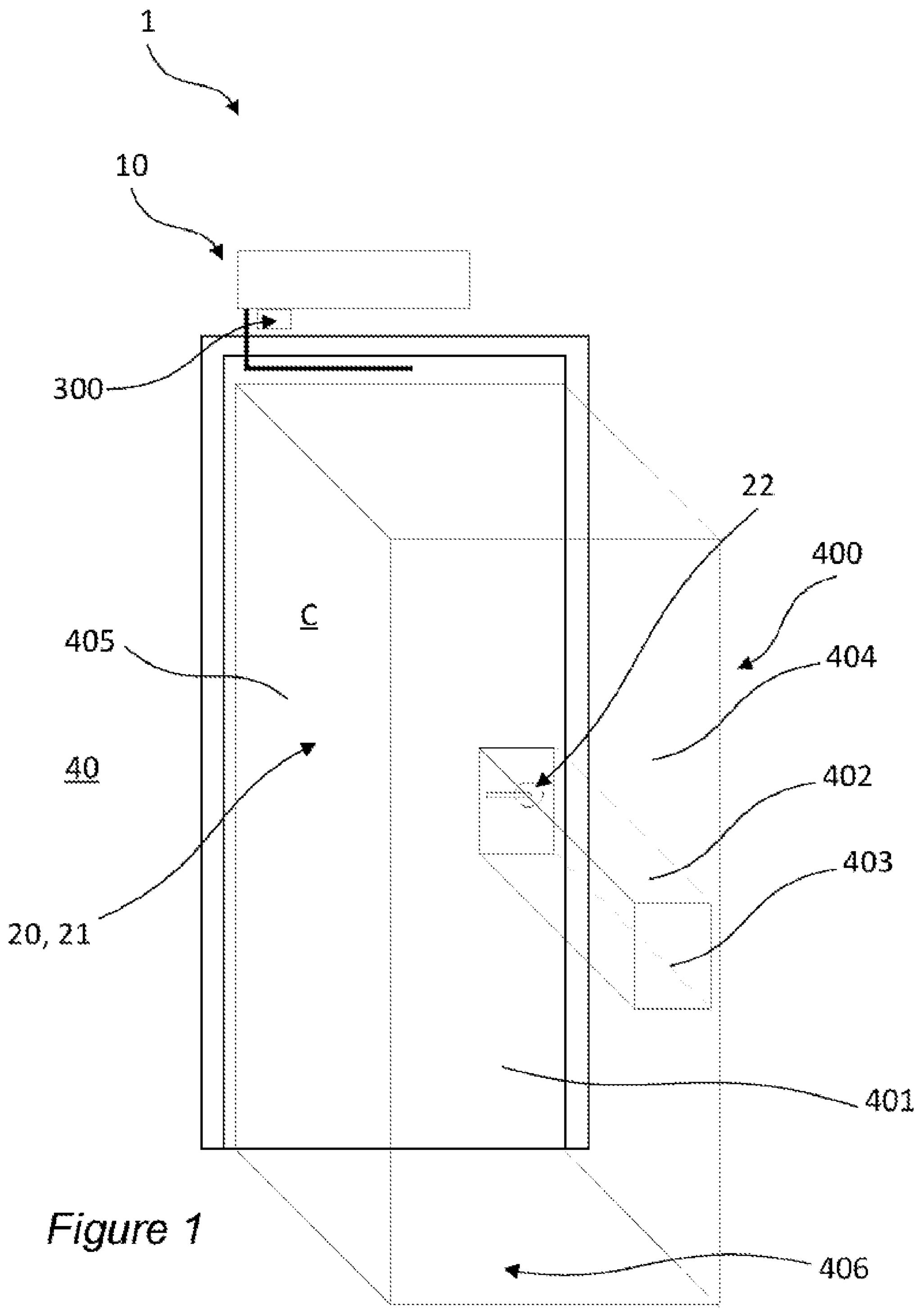
FIG. 1 shows a perspective view of a swing door system having a swing door operator.

FIG. 1 shows a swing door system 1 comprising a swing door operator 10 and a swing door leaf 20. The swing door leaf 20 is mounted in an opening in a wall 40. The swing door operator 10 is connected to the swing door leaf 20 and configured to move the swing door leaf 20 from a closed position C, as is disclosed in FIGS. 1 and 2, to an open position O, as is disclosed in FIG. 3 by the arrow.

The swing door leaf 20 comprises a first side 21 and a second side 23. According to an embodiment the swing door leaf 20 comprises a door handle 22 positioned on the first side and a door handle on the second side 23. The swing door leaf 20 is hinged or pivoted to a doorframe via a hinge at one or more of its edges. The swing door leaf 20 as such and the connection to the wall and to the swing door operator 10 is well known and thus not described in detail herein.

The swing door operator 10 comprises at least one drive unit 100, a control unit 200 and a sensor 300, as is disclosed in FIG. 4. The control unit 200 is operatively connected to the drive unit 100 and to the sensor 300. The control unit 200 is configured to regulate the drive unit 100 to move the swing door leaf 20 between the closed and open position C, O. The sensor 300 is configured to identify an object 30 in a safety volume 400. The safety volume 400 is a volume above a safety zone 406. The safety volume 400 is a volume in front of the first side 21 of the swing door leaf 20 that the swing door leaf 20 moves in when it is moved from the closed position C to the open position O. The safety volume 400 is positioned in front of the first side 21 of the swing door leaf 20. The safety volume 400 comprises a first volume 401 and a second volume 402, as is disclosed in FIGS. 1-3, 5 and 6. The second volume 402 extending from at least an outer surface 403 of the safety volume 400 towards the swing door leaf 20. By an outer surface 403 is meant a boarder of the safety volume 400 that is facing away from the swing door leaf 20. The control unit 200 is configured to receive input from the sensor 200. The control unit 200 is configured to, based on input from the sensor 300, determine if an object 30 is positioned in the first or the second volume 401, 402 of the safety volume 400. The control unit 200 is configured to regulate the drive unit 100 to move the swing door leaf 20 according to a safety action if an object 30 is determined to be positioned in the first volume 401 of the safety volume 400. The control unit 200 is configured to regulate the drive unit 100 to move the swing door leaf 20 according to a second action if an object 30 is determined to be positioned in the second volume 402 of the safety volume 400.

The object 30 could be a person 30 or a part 30 of a person.

Figure 2:
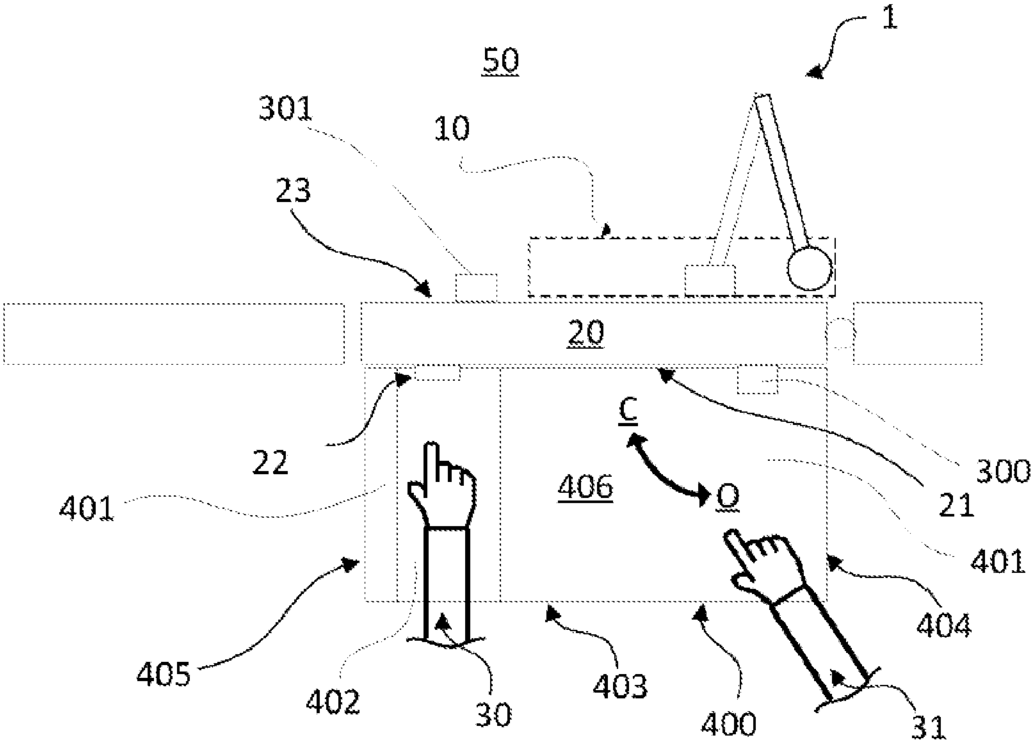
FIG. 2 shows a top view of a swing door system having a swing door operator in a closed position.
Figure 3:
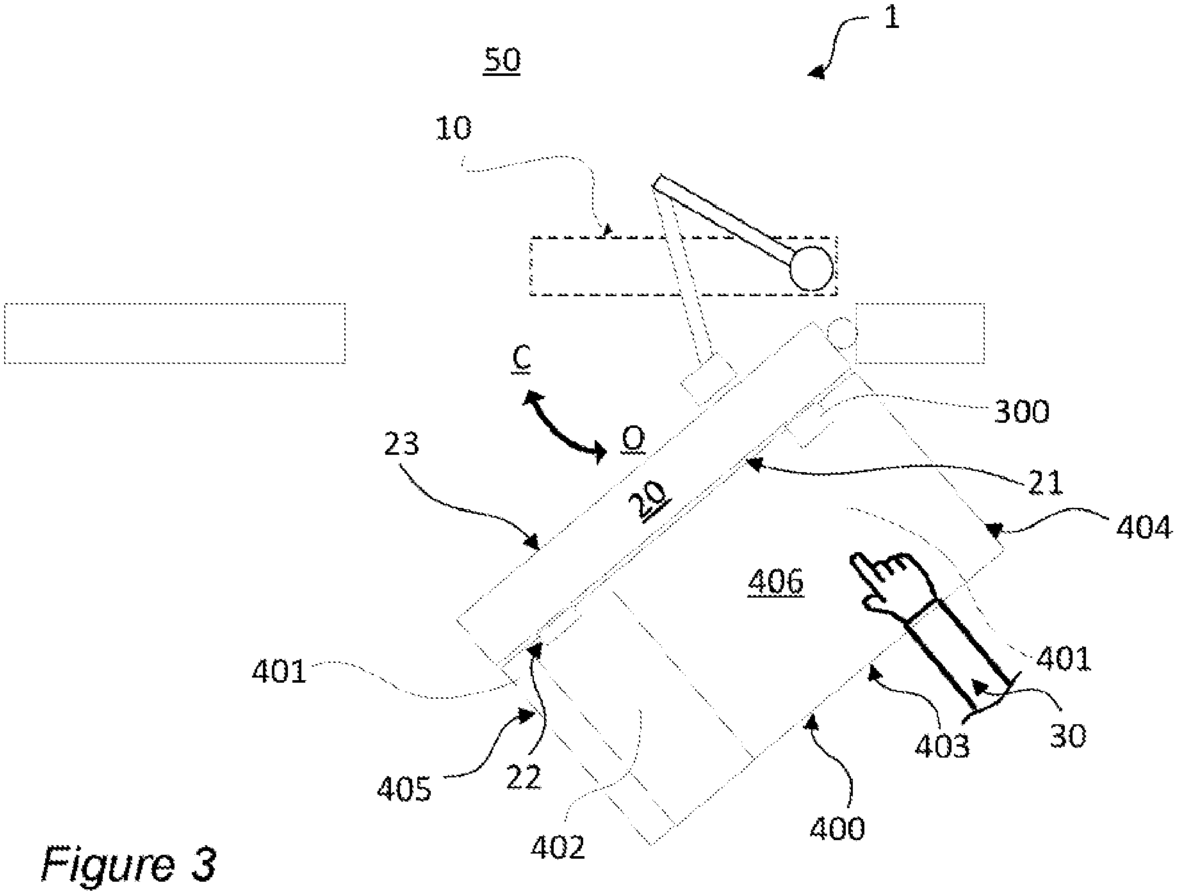

The safety volume 400 comprises an outer surface 403. The outer surface 403 is facing away from the swing door leaf 20. In FIGS. 2 and 3 the outer surface 403 is the surface of the safety volume 400 that is opposite to a surface of the safety volume that is facing the first side 21 of the swing door leaf 20. The safety volume comprises further outer surfaces 404, 405. The outer surfaces 403 is one of the surface that define the safety volume 400 and that not is facing towards the first side 21 of the swing door leaf 20. Put in another way, the outer surface 403 is a surface of the safety volume 400 that a person reaching for the swing door leaf 20 has to cross to reach the first side 21 of the swing door leaf 20. The number and directions of the outer surfaces 403, 404, 405 of the safety volume 400 depends on the shape of the safety volume 400. According to some embodiments the outer surfaces 403, 404, 405 is a planar surface. According to some embodiments the outer surfaces 403, 404, 405 is a curved, inclined or sphere shaped surfaces.

According to an aspect the safety volume 400 is a volume in front of the first side 21 of the swing door leaf 20 that the swing door leaf 20 moves in when it is moved from the open position O to the closed position O.

According to an embodiment the safety action of the control unit 200 comprises to stop the drive unit 100 from moving the swing door leaf 20. According to an embodiment the safety action of the control unit 200 comprises to reverse the drive unit 100 to move the swing door leaf 20 in an opposite direction. According to an embodiment the safety action of the control unit 200 comprises to stop the drive unit 100 from moving the swing door leaf 20 and to reverse the drive unit 100 to move the swing door leaf 20 an a opposite direction According to an embodiment the second action of the control unit 200 comprises to continue to move the swing door leaf 20 by the drive unit 100 between the closed and open position C, O as if the object 30 has not been identified.

According to an embodiment the second action of the control unit 200 comprises to initiate an opening of the swing door leaf 20 by the drive unit 100 to move the swing door leaf 20 between the closed and open position C, O.

According to an embodiment the second volume 402 extends from the at least one outer surface 403 of the safety volume to the swing door leaf 20.

According to an embodiment the second volume 402 has a shape corresponding to a through going hole in the safety volume 400, as is disclosed in FIG. 1. By this an object 30, such as an arm 30 of a person reaching for the handle 22 of the swing door leaf 20, could be moved from outside the safety volume 400 to the first side 21 of the swing door leaf 20 in the second volume 402.

According to an embodiment the second volume 402 has one or more of a cubical, pyramid, cone, and cylindrical shape. A cone shape is particularly advantageous since it allows for easier manual operation of the door, due to only a small volume of the second volume being adjacent to the door and affecting the actions issued by the operator. Thus the tapered portion of the cone may be adjacent to the door.

According to an embodiment the second volume 402 extends from at least one or more further outer surfaces 404,405 of the safety volume 400 towards the swing door leaf 20, as is disclosed in FIGS. 5 and 6. According to an embodiment the second volume 402 is a horizontal segment 402 and the first volume 401 is positioned above and below the second volume, as is disclosed in FIG. 5. According to an embodiment the second volume 402 is a vertical segment 402 and the first volume 401 is positioned to the left and to the right of the second volume 402, as is disclosed in FIG. 6.

According to an embodiment the control unit 200 is configured to regulate the drive unit 100 to move the swing door leaf 20 according to the safety action or the second action if a first object 30, 31 is determined to be positioned in the first volume 401 and in the second volume 402 of the safety volume 400.

According to an embodiment the control unit 200 is configured to regulate the drive unit 100 to move the swing door leaf 20 according to the safety action if the first object 30, 31 is determined to be positioned in the first volume 401 and a second object 30, 32 is determined to be positioned in the second volume 402 of the safety volume 400.

According to an embodiment the safety volume 400 has a cubical or wedge shape.

According to an embodiment the safety volume 400 at least comprises a volume above a safety zone 406 at which the swing door leaf 20 moves when it is moved between the closed to the open position C, O.

According to an embodiment the first side 21 of the swing door leaf 20 is directed towards the direction that the swing door leaf 20 moves when it is moved from the closed position C towards the open position O.

According to some embodiments, the first side 21 of the swing door leaf 20 is directed away from the direction that the swing door leaf 20 moves when it is moved from the closed position C towards the open position O.

FIGS. 2 and 3 shows a top view of a room 50 with the swing door system 1 having the safety zone 406 according to an embodiment of the present disclosure. The swing door operator 10 can be seen with an object 30 in the form of an arm 30 reaching for the door handle 22 of the swing door leaf 20 and a second object 31 in the form of an arm 31. In FIG. 2 the swing door leaf 20 is in the closed position C and in FIG. 3 the swing door leaf 20 is moved towards the open position O. The object 30 and the second object 31 are according to an embodiment part of a same object 30, 31. The object 30 could for instance be one arm or leg 30 of a person and the second object 31 could be the other leg or arm of the person. The object 30 and the second object 31 are according to an embodiment part of different objects 30, 31

FIG. 4 is a more detailed schematic view of a swing door operator 10 according one embodiment of the invention showing a swing door operator 10 for moving a swing door leaf 20 in a swing path between an open and closed position O, C. The swing door operator 10 comprises at least one drive unit 100 arranged to move the swing door leaf 10 between the open and closed position O, C. The swing operator 10 further comprises a control unit 200 that is operatively connected to the drive unit 100 and a sensor 300. The sensor 300 is configured to identify objects in front of the first side 21 of the swing door leaf 20. The control unit 200 is configured to react if the object 30, 31 is identified by the sensor 300 in a safety zone 400 in front of the first side 21 of the swing door leaf 20. The drive unit 100 comprises according to an embodiment a motor 101 and a spring 102. The drive unit 100 is connected to an arm system 103. The arm system 103 is connected to the door leaf 20.

The drive unit 100 is connected to an axle 103 and an arm system comprising one or more arms and/or an arm guide. The swing door operator 10 according to an aspect comprises further components, such as a battery (not disclosed) and one or more different sensors and one or more cable connections between associated parts for operational control of them. These components as such are known in the art and will not be described in detail herein The drive unit 100 could further comprising a gearbox (not disclosed). The drive unit 100 is adapted to be connected to the door leaf 20 via the axle 103 and the arm system and to move the swing door leaf 20 between the open and closed position O, C, i.e. from the open position to the closed position and from the closed position to the open position. The motor 101 and the spring 102 are connected to the axle 103. The motor 101 and the spring 102 are arranged to interact to rotate the axle 1. The spring 102 is according to an aspect a torsion spring 102. According to one aspect the spring 102 is winded around the axle 103. According to an aspect the axle 103 is connected to the drive unit 100 and extends downwards from the drive unit 100. According to an aspect the axle 103 is positioned on one side of the drive unit 100. According to an aspect the axle 1 is positioned on one side of the motor 101 and the spring 102.

The spring 102 are moved/compressed by the motor 102 when it is moving the swing door leaf 20 in one direction and the motor 101 and the spring 102 together moves the swing door leaf 20 in the opposite direction. In this way the spring 102 always have stored energy to move the swing door leaf 20 back to a starting position. This position could be either the open position or the closed position.

The axle 103 is in one end connected to the drive unit 100. The axle 103 is connected to both the motor 101 and the spring 102. The axle 103 is in the other end connected to the arm system. When the axle 103 is rotated by the drive unit 100 it also rotates and moves the arm system.

According to an embodiment the swing door operator 10 is a pull swing door operator. According to an embodiment the swing door operator 10 is a push swing door operator.

The second aspect of this disclosure shows the swing door system 1 comprising a swing door leaf 20 and a swing door operator 10 according to any of the first aspect.

The third aspect of this disclosure, as is disclosed in FIG. 7, shows a method 2 of regulating a swing door operator 10 for moving a swing door leaf 20 between a closed and an open position C, O. The swing door operator 10 comprising at least one drive unit 100, the control unit 200 and the sensor 300. The control unit 200 is operatively connected to the drive unit 100 and to the sensor 300 and configured to regulate the drive unit 100 to move the swing door leaf 20 between the closed and open position C, O. The method comprising the step of identifying S1, by the sensor 300, an object 30 in the safety volume 400 in front of the first side 21 of the swing door leaf 20. The safety volume 400 comprising a first volume 401 and a second volume 402, the second volume 402 extending from at least an outer surface 403 of the safety volume 400 towards the swing door leaf 20. The method further comprising determining S2, based on input from the sensor 300, if the object 30 is positioned in the first or the second volume 401,402 of the safety volume 400, regulating S3 the drive unit 100 to move the swing door leaf 20 according to a safety action, if an object 30 is determined to be positioned in the first volume 401 of the safety volume 400, and regulating S4 the drive unit 100 to move the swing door leaf 20 according to a second action if an object 30 is determined to be positioned in the second volume 402 of the safety volume 400.

According to an embodiment the second action of the step of regulating S4 comprises to continue to move the swing door leaf 20 by the drive unit 100 between the closed and open position C, O as if the object has not been identified.

According to an embodiment the second action of the step of regulating S4 comprises to initiate an opening of the swing door leaf 20.

According to an embodiment the second action of the step of regulating S4 comprises to continue to move the swing door leaf 20 by the drive unit 100 between the closed and open position C, O at a lower speed than if the object has not been identified.

The control unit 200 is configured to react if an object is identified by the second sensor 301 in a second safety volume in front of the second side 23 of the swing door leaf 20. The control unit 100 is according to an aspect configured to adapt the size and shape of the safety volume 400 and/or the second safety volume based on the swing path of the swing door leaf 20 and the position of the swing door leaf 20. The control unit 100 is according to an aspect configured to adapt the size and shape of the first and second volumes 401, 402 of the safety volume 400 and/or the second safety.

As shown in FIG. 4 the swing door operator 10 may further also comprises a memory 111 and communication means 112. The control unit 400 is configured to set the size of the safety volume 400 and the size and shape of the first volume 401 and second volume 402 based on information stored on the memory 111. The information may be changed via external connection to the communication means 112 so that customized safety volume 400, the first volume 401 and the second volume 402 may be used or the safety volume 400, the first volume 401 and the second volume 402 may be changed for the swing door operator due to the circumstances or demands.

The swing door leaf 20 may further be manually opened also when the swing door operator 10 has stopped the movement of the swing door leaf 20 so that a person is not trapped in a room by the swing door operator 10.

The control unit 200 is configured to initiate/activate and perform autonomous operation of the swing door operator 10 in cooperation with the sensor 300.

Hereafter an example of the aspects will be described with reference to the figures. A person that intends to open the swing door leaf 20 is approaching the first side 21 of the swing door leaf 20. The person reaches out for the handle 22 of the swing door leaf 20 for opening the swing door leaf 20 by moving it from the closed position C to the open position O. The arm 30 of the person enters into the safety volume 400 of the swing door operator 10 and the swing door system 1. The sensor 300 will identify S1 the arm 30 as an object 30 in the safety volume 400. The sensor 300 will identify one or more of a distance and angle from the sensor 300 and the arm 30. The sensor 300 is connected to the control unit 200 and sends information of the identified arm 30 to the control unit 200. The control unit 200 receives the information of the arm as an object 30 from the sensor 300. The control unit 200 determines S2 the position of the object 30 relative to the sensor 300 based on the input from the sensor 300. Thereafter the control unit 200 determines S2 if the position of the object is positioned in the first or the second volume 401, 402 of the safety volume 400. If the second volume 402 is positioned in front of the door handle 22 of the first side 21 of the swing door leaf 20, the arm 30 will be positioned in the second volume 402. As the arm 30 is identified S1 and determined S2 to be positioned in the second volume 402, the control unit 200 will regulating S4 the drive unit 100 to move the swing door leaf 20 according to a second action.

According to an aspect the second action could be to initiate an opening of the swing door leaf 20, i.e. to start regulating the drive unit 100 to move the swing door leaf 20 from the closed position C towards the open position O. The opening could according to an aspect be initiated when the person reaches for the door handle 22. The opening could according to an aspect be initiated when the person touches the door handle 22. The opening could according to an aspect be initiated when the person moves the door handle 22. The opening could according to an aspect be initiated when the person reaches for the first side 21 of the swing door leaf, i.e. the swing door leaf 20 does not need to have an actual door handle 22 to be opened. When the drive unit 100 starts moving the swing door leaf 20 the persons arm 30, i.e. the object 30, is positioned in the safety volume 400, the swing door operator 10 will identify that an object 30 is positioned in the safety volume 30 but it will not initiate regulating S3 the drive unit 100 according to a safety action since the object 30 is positioned in the second volume 402.

If the person or any other object 30 is identified by the sensor 300 in the first volume 401, the drive unit 100 will be regulated S3 to move the swing door leaf 20 according to a safety action. The safety action is according to an aspect to stop the drive unit 100 from moving the swing door leaf 20. The safety action is according to an aspect to stop the drive unit 100 from moving the swing door leaf 20 and to move it in the opposite direction back to the closed position C.

When an opening of the swing door leaf 20 has been initiated, the person moves the arm 30 away from the moving swing door leaf 20 as it is ready for that the swing door leaf 20 should start moving. According to an aspect the size and shape of the second volume 402 is configured to account for that the person moves the arm 30 away from the swing door leaf 20 when it is moved. The second volume 402 could have a cone shape with the narrow part positioned at the first side 21 of the swing door leaf 20.

If the sensor 300 identifies an object 30 in the second volume 402 and a second object 31 in the first volume 401, as is disclosed in FIG. 2, the control unit 200 is according an aspect configured to regulate the drive unit 100 according to the safety action. According to an aspect the control unit 200 is configured to regulate the drive unit 100 according to the second action if the sensor 300 identifies an object 30 in the second volume 402 and a second object 31 in the first volume 401. According to an aspect the the control unit 200 is configured to regulate the drive unit 100 according to a third action if the sensor 300 identifies an object 30 in the second volume 402 and a second object 31 in the first volume 401. The third action could according to an aspect be that the control unit 200 regulates the drive unit 100 to continue to move the swing door leaf 20 towards the open position O in a lower speed than if no object is identified in the first volume 401. According to an aspect the second action could be that the control unit 200 regulates the drive unit 100 to move the swing door leaf 20 towards the open position O in a lower speed if an object is identified in the second volume 402 than if no objet is identified in the second volume 402. Thus, in case of the second volume being a volume around the handle of the door or an area of the door suitable for manual operation, the risk for the door colliding with the fingers of the user is mitigated.

According to an aspect the control unit 200 is configured to regulate the drive unit 100 in the same way, i.e. according to the second action, even if two or more objects 30 is identified in the second volume 402. According to an aspect the control unit 200 is configured to regulate the drive unit 100 according to the safety action if two or more objects 30 is identified in the second volume 402.

According to an aspect the opening of the swing door leaf 20 is continued if the object 30 is moved away from the safety volume 400 and the sensor 300 no longer identifies any object 30 in the first volume 401 of the safety volume.

According to an aspect the swing door operator 10 comprises a second sensor 301 configured to identify objects on a second side 23 of door leaf 20. The second sensor 301 is configured to perform the corresponding steps as the sensor 300 when the swing door operator 10 moves the swing door leaf 20 from the open position O towards the closed position C. The second sensor 301 is connected to the control unit 200. The control unit 200 is configured to regulate the drive unit 100 in a corresponding way to move the swing door leaf 20 from the open position O to the closed position C as it regulates the drive unit 100 to move the swing door leaf 20 from the closed position C to the open position O.

Features or steps in one embodiment or aspect according to the above, could be combined with any other features or steps of any one or more of the other embodiments or aspects.

The person skilled in the art realizes that the present invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A swing door operator for moving a swing door leaf between a closed and an open position (C, O), the swing door operator comprising at least one drive unit, a control unit and a sensor, the control unit is operatively connected to the drive unit and to the sensor and configured to regulate the drive unit to move the swing door leaf between the closed and open position (C, O), wherein the sensor is configured to identify an object in a safety volume in front of a first side of the swing door leaf, the safety volume comprising a first volume and a second volume, wherein the first volume and the second volume each extend from at least an outer surface of the safety volume towards the swing door leaf, the control unit is configured, based on input from the sensor, to determine that the object is positioned in the first or the second volume of the safety volume, the control unit is configured to regulate the drive unit to move the swing door leaf according to a safety action in response to a determination that the object is positioned in the first volume of the safety volume, and the control unit is configured to regulate the drive unit to move the swing door leaf according to a second action in response to a determination that the object is positioned in the second volume of the safety volume.

2. The swing door operator according to claim 1, wherein the safety action of the control unit comprises to stop the drive unit from moving the swing door leaf and/or to reverse the drive unit to move the swing door leaf in an opposite direction.

3. The swing door operator according to claim 1, wherein the second action of the control unit comprises to continue to move the swing door leaf by the drive unit between the closed and open position (C, O).

4. The swing door operator according to claim 1, wherein the second action of the control unit comprises to initiate an opening of the swing door leaf by the drive unit to move the swing door leaf between the closed and open position (C, O).

5. The swing door operator according to claim 1, wherein the second volume extends from the at least one outer surface of the safety volume to the swing door leaf.

6. The swing door operator according to claim 1, wherein the second volume has a shape corresponding to a through going hole in the safety volume.

7. The swing door operator according to claim 1, wherein the second volume has one or more of a cubical, a pyramid, a cone and a cylindrical shape.

8. The swing door operator according to claim 1, wherein the second volume extends from at least one or more further outer surfaces of the safety volume towards the swing door leaf.

9. The swing door operator according to claim 1, wherein the control unit is configured to regulate the drive unit to move the swing door leaf according to the safety action or the second action in response to a determination that a first object is positioned in the first volume and that the first object is in the second volume of the safety volume.

10. The swing door operator according to claim 9, wherein the control unit is configured to regulate the drive unit to move the swing door leaf according to the safety action in response to a determination that the first object is in the first volume and a determination that a second object is in the second volume of the safety volume.

11. The swing door operator according to claim 1, wherein the safety volume has a cubical or wedge shape.

12. The swing door operator according to claim 1, wherein the second volume has a conical or wedge shape.

13. The swing door operator according to claim 1, wherein the safety volume at least comprises a volume above a safety zone traversed by the swing door leaf between the closed and the open position (C, O).

14. The swing door operator according to claim 1, wherein the first side of the swing door leaf is directed towards a direction that the swing door leaf travels from the closed position (C) towards the open position (O).

15. A swing door system comprising a swing door leaf and a swing door operator according to claim 1.

16. A method of regulating a swing door operator for moving a swing door leaf between a closed and an open position (C, O), the swing door operator comprising at least one drive unit, a control unit and a sensor, the control unit is operatively connected to the drive unit and to the sensor and configured to regulate the drive unit to move the swing door leaf between the closed and open position (C, O), the method comprising identifying (S1), by the sensor, an object in a safety volume in front of a first side of the swing door leaf, the safety volume comprising a first volume and a second volume, wherein the first volume and the second volume each extend from at least an outer surface of the safety volume towards the swing door leaf, determining (S2), based on input from the sensor, that the object is positioned in the first or the second volume of the safety volume, regulating (S3) the drive unit to move the swing door leaf according to a safety action, in response to a determination that the object is in the first volume of the safety volume, and regulating (S4) the drive unit to move the swing door leaf according to a second action in response to a determination that the object is in the second volume of the safety volume.

17. The method according to claim 16, wherein the second action of the step of regulating (S4) comprises to continue to move the swing door leaf by the drive unit between the closed and open position (C, O).

18. The method according to claim 16, wherein the second action of the step of regulating (S4) comprises to initiate an opening of the swing door leaf.

19. The method according to claim 16, wherein the second action of the step of regulating (S4) comprises to continue to move the swing door leaf by the drive unit between the closed and open position (C, O) at a lower speed.

* * * * *